Figure 1:
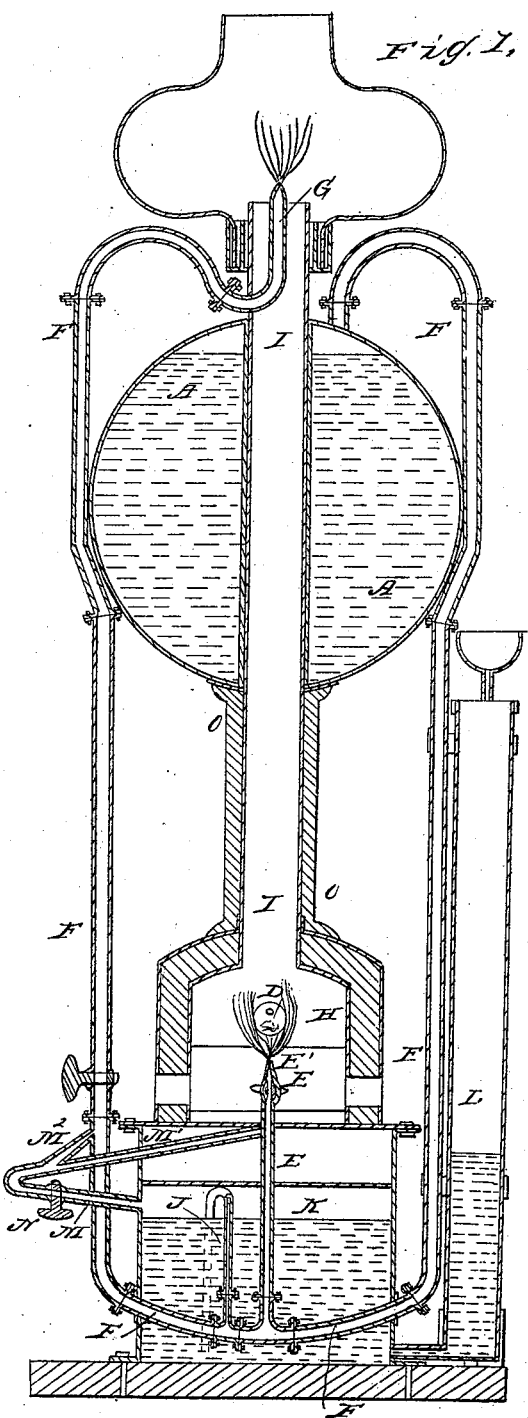

A. VON SCHUTTENBACH.
Lamp.

No. 24,509.

3 Sheets—Sheet 1.

Patented June 21, 1859.

A. VON SCHUTTENBACH.
Lamp.

3 Sheets—Sheet 3.

No. 24,509.

Patented June 21, 1859.

UNITED STATES PATENT OFFICE.

A. VON SCHUTTENBACH, OF ST. PETERSBURG, RUSSIA.

FLUID-LAMP.

Specification of Letters Patent No. 24,509, dated June 21, 1859.

*To all whom it may concern:*

Be it known that I, ANTON VON SCHUTTENBACH, of St. Petersburg, Russia, a subject of the Emperor of all the Russias, have invented or discovered new and useful Improvements in Lamps; and I, the said ANTON VON SCHUTTENBACH, do hereby declare the nature of the invention and in what manner the same is to be performed are particularly described and ascertained in and by the following description thereof, reference being had to the drawings hereunto annexed and to the figures and letters marked thereon, that is to say—

This invention has for its object improvements in lamps. For these purposes a reservoir of a globular or other suitable shape is used to contain the oil or fluid employed and from this reservoir descends a small tube with a stop cock thereon and the lower end of this tube enters into a retort formed by preference of platina. The gas generated in the retort rises up through a pipe which at its upper end is bent downward so as to descend nearly to the bottom of the oil or fluid in the reservoir which is supplied with oil through a descending tube which has at its upper end a funnel and a stop cock. Below and around the retort is formed a chamber which is closed in and surrounded by charcoal powder or other suitable non-conducting material. From the lower chamber which contains the retort a chimney rises upward and passes through the reservoir. The part of such chimney which is below the reservoir is surrounded by ivory or other nonconductor of heat in order that the lamp may be carried by the hand embracing this part of the lamp. From the upper part of the reservoir a pipe descends and passes through the lower compartment of the lamp where a gas meter or holder is formed which is kept partly filled with water. The gas is supplied to the upper part of this chamber or gas holder by a short branch pipe fixed to the descending pipe just mentioned. There is also another branch pipe which rises through the gas holder and a burner thereon comes under the retort so that the heat of the gas burned thereby may be the means of heating the retort, and such burner is regulated and closed by a suitable stop cock. From the upper part of the gas holder or gasometer there is a branch pipe having a stop cock this pipe by two branches communicating with the rising gas supply pipe which is a continuation of the descending gas pipe before mentioned and this rising gas pipe supplies gas to the upper burner or burners there being a suitable stop cock to regulate and stop the supply. The gasometer or holder is connected to a vessel into which the water is pressed when the upper part of the gasometer or gas holder becomes filled with gas hence there will be a supply of gas in the lamp to start with after the lamp has for a time been out of use.

Having thus stated the nature of my said invention I will proceed more fully to describe the manner of performing the same.

Figure 2:
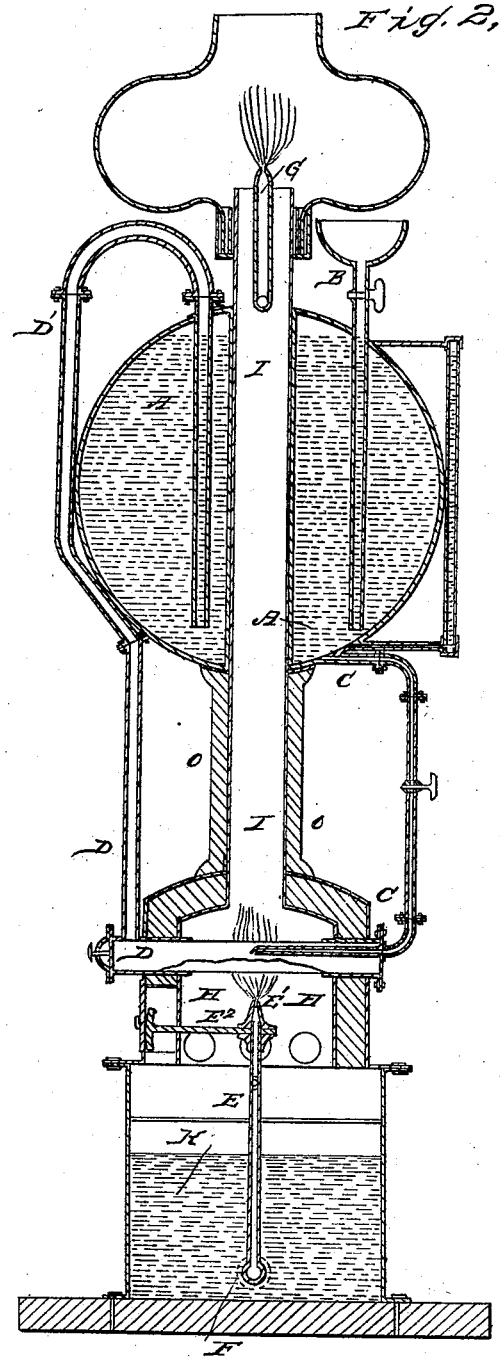
Figure 3:
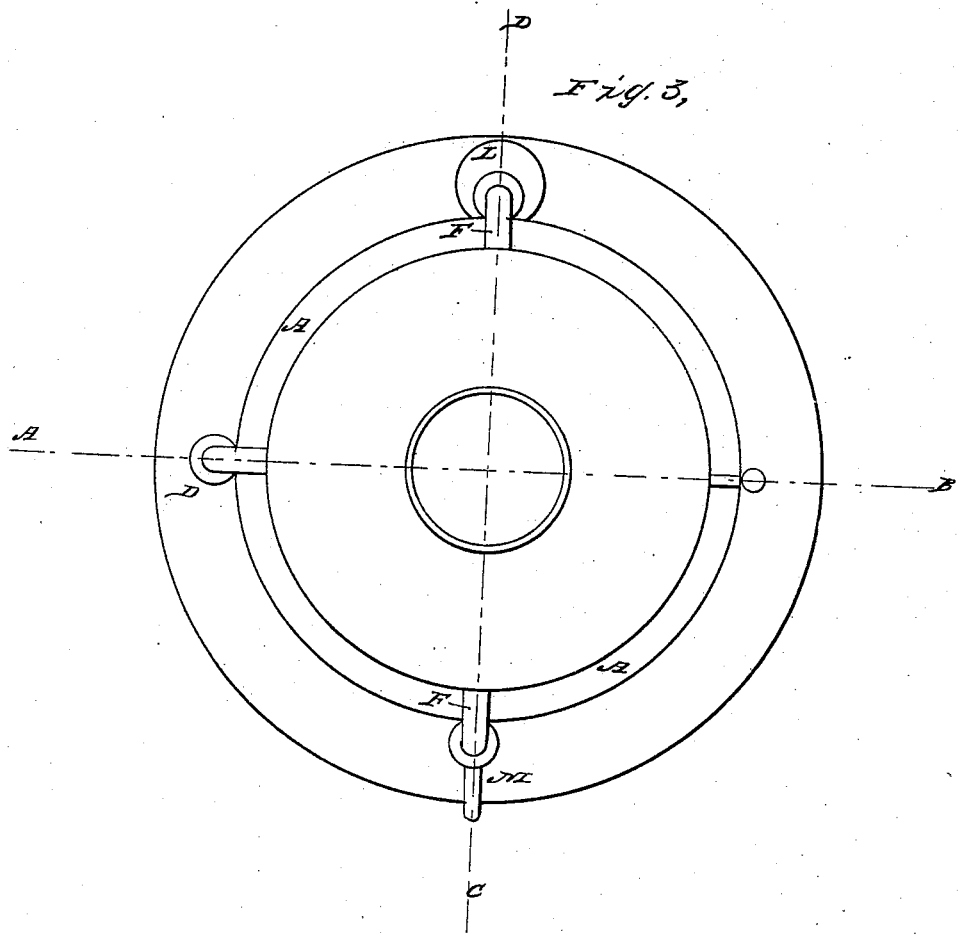

Figures 1 and 2 are two vertical sections of a lamp and apparatus constructed and combined according to my invention and Fig. 3 is a plan thereof.

A is the reservoir into which the oil is to be filled or supplied through a descending pipe B which has a funnel and stop cock at its upper end.

C is a pipe or tube descending from the lower part of the reservoir into the retort D which it is preferred should be formed of platina and have a small quantity of broken coke or charcoal at the bottom over which the oil supplied thereto is allowed to drop in regulated quantities according to the quantity of gas desired to be generated.

The retort is kept heated by a gas flame at E′, which is at the upper end of a branch pipe or tube E there being a stop cock at E², to regulate and shut off the supply of gas. The branch pipe is attached to the gas pipe F which is attached to the upper part of the reservoir A and descends under the retort and then ascends up to the point G where a gas burner or burners are applied. The retort is set within a chamber H which is surrounded by a double case containing powdered coke or other suitable non-conductor of heat.

I is a chimney rising from the chamber H and through the reservoir as shown.

J is a branch pipe or tube by which gas flows into the upper part of the gas holder or gasometer K which is supplied with water from a vessel L and into which vessel the water is pressed as the gas holding vessel K fills with gas.

M is a pipe connected with the upper part of the gas holder K and this pipe by two branches M¹, M², is connected with the gas pipe F and the branch E and gas is prevented flowing from the gas holder or gasometer K by stop cock N. The chimney at O is surrounded by ivory or other suitable non-conductor of heat.

By the application of the pipe D¹, to the oil reservoir and the retort connected by a pipe, C, the said oil reservoir is employed not only as a means of supplying the retort with oil, but as a gas holder and a purifier of the gas which may arise from the retort. Furthermore, the arrangement of the chimney, I, through the vessel, A, enables the liquid contents of the said vessel to receive heat from such chimney, before they pass into the retort. In this way, heat is economized. By disposing the gas burner tube G, in the upper end of the chimney its flame will burn up any inflammable products which may escape up the chimney and from the burner of the retort chamber. The employment of the vessel, L, with reference to the vessel K, or secondary gasometer enables the said vessel K, to operate to good advantage as a gasometer or reservoir of gas particularly when a surplus thereof is being formed. By the arrangement of the pipe, F, and its branches, E, J, and M, M¹ with respect to the vessel K, the gas as it descends from the vessel, A, may be burned without having to go through the water in the vessel, K, the surplus gas only being made to pass into the same it being drawn therefrom by opening the stopcock N.

Having thus described the nature of my invention and the manner of performing the same I would remark that I make no claim to the mechanical parts thereof, separately considered, and I would also state that I am aware that prior to my invention lamps were constructed to generate gas or an inflammable vapor by one flame, such gas so generated serving not only to maintain the generating flame but to supply other burners or maintain other flames. I do not therefore claim the same but

What I do claim as my invention is—

The combination of the gas holder or gasometer, A, the vessel, K, the pine, N, with its branches, the pipe, F, the chamber, H, the chimney, I, the oil reservoir, A, and the burner, G, the whole being applied and made to operate together substantially as specified.

ANTON VON SCHUTTENBACH.

Witnesses:
 GEO. PITT,
 JNO. ALCOCK.